(No Model.)
J. F. BARKER.
APPARATUS FOR MIXING AERIFORM FLUIDS.
No. 254,589.  Patented Mar. 7, 1882.
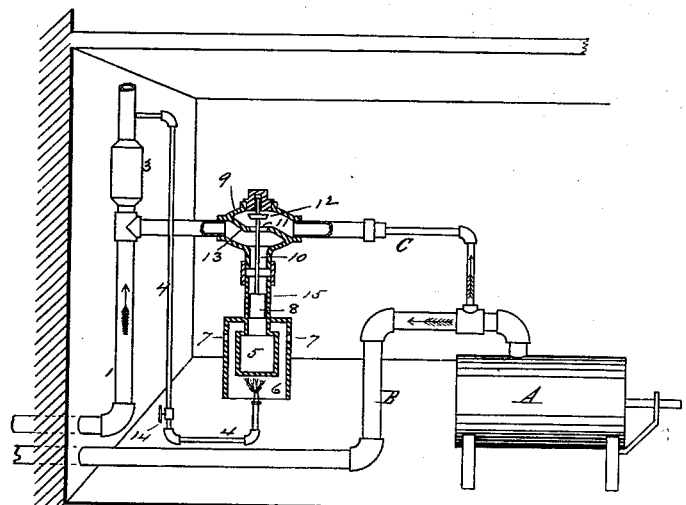
Fig. I
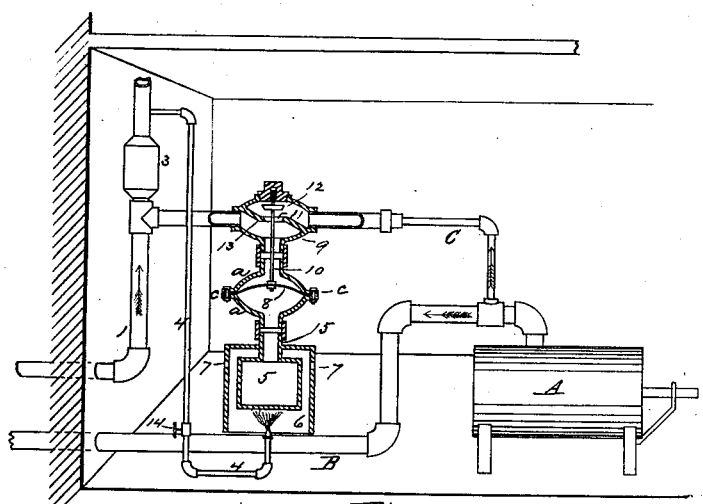
Fig. II
Witnesses.
T. Aleutis.
Chas. H. Wood.
Inventor.
John F. Barker

UNITED STATES PATENT OFFICE.

JOHN F. BARKER, OF SPRINGFIELD, MASSACHUSETTS.

APPARATUS FOR MIXING AERIFORM FLUIDS.

SPECIFICATION forming part of Letters Patent No. 254,589, dated March 7, 1882,

Application filed March 26, 1881. Renewed December 19, 1881. (No model.)

*To all whom it may concern:*

Be it known that I, JOHN F. BARKER, of Springfield, in the county of Hampden, and State of Massachusetts, have invented a new and useful Apparatus for Mixing Aeriform Fluids, of which the following is a specification and description, reference being had to the accompanying drawings, and to the letters and figures of reference marked thereon.

The object of my invention is to mix two aeriform fluids together, which are susceptible of combustion when mixed, in any desired proportions which may be predetermined upon; and the invention is particularly and especially adapted for the proper and desired admixture of atmospheric air with any light hydrocarbon vapor for the purposes of illumination.

For convenience in the present description I shall give the name of "vapor-gas" to this hydrocarbon vapor, which, as is well known, is produced by charging common atmospheric air with the vapor of any light hydrocarbon oil, ordinary gasoline being the substance most commonly used, and the methods of producing it by forcing common air through any of the well-known generators being also well known and understood. It is also as well known that this vapor-gas as it comes from the generator is much too rich in carbon to produce the best effect in illumination, and that before it passes to the burners it is necessary to dilute it by mixing with it in proper and suitable proportions common atmospheric air which has not been charged with vapor. To do this where the number of burners consuming this vapor-gas is being constantly varied in number, and and yet to maintain a uniform quality of light at each burner, has been very difficult and next to impossible by any apparatus operated by hand, because a change in the amount of air mixed with the vapor is required every time a change is made in the number of burners used in any considerable number, whether more are used or less. A change in the amount of common air is also required constantly, and although this change may be almost imperceptible from day to day for a long time, yet it is in the end very marked, is very necessary, and could not be made successfully by hand, and its necessity is occasioned by the constant absorption of the vapor from the hydrocarbon oil in the generator from day to day. Suppose the generator to have just been filled with fresh gasoline, of course the vapor absorbed therefrom by the air passing through the generator will be exceedingly rich in carbon, and could not without adulteration with air be successfully used in that condition for the purposes of illumination, and a large proportion of air would be required to be mixed with it before passing to the burners. Of course when a large number of burners were used a little less air would be required from day to day, as the vapor became more exhausted, until, perhaps, when the generator again required filling, no air might be required, or at least very little. It will readily be seen that this change of admission of air to the current of vapor-gas for the purpose of dilution will have been made almost imperceptibly from day to day; but if now the generator be filled again with fresh gasoline, a change will be necessitated from little or no air to the greatest proportion admitted to dilute the vapor-gas, so that the conditions of these changes in the admission of air for the purpose of dilution are constantly varying.

It is the object of my invention to make these changes perfectly automatic, so as to keep the quality of light at each burner perfectly uniform under all circumstances, whether the number of burners in use be more or less, and whether the vapor-gas be more or less rich in carbon.

Figure I represents, in vertical section, one modification of an apparatus containing my invention, showing its connection with the pipes of a hydrocarbon-vapor-burning system; and Fig. II represents a similar section of another modification, showing its connection with a similar system.

In the drawings, A represents a pump for forcing atmospheric air through a pipe, B, into and through any ordinary generator conveniently and desirably located, and containing the hydrocarbon oil, the vapor from which is absorbed and carried through the pipe 1 to burners, where it is consumed for illuminating purposes.

At any convenient point in the air-pipe B, I attach or connect a branch pipe, C, which I also connect at its other end with the gas-pipe 1 at any point below the mixer 3, but preferably quite near to it.

At any desired and convenient point in the branch air-pipe C, I secure a valve-case, 9, containing a valve and valve-orifice, in such a manner that the air, in passing from the pump A through the pipe C and into the gas-pipe 1, must pass through this valve-orifice, and the valve regulates and controls the atmospheric air (as to its amount) which passes through the pipe C into the pipe 1. The movements of this valve are caused primarily by the air itself after passing through the valve-orifice and into the pipe 1, according as more or less of it is mixed with the hydrocarbon vapor passing through said pipe 1, as hereinafter described.

Preferably just above the mixer 3—which is merely an enlargement of the pipe 1, and containing suitable screens and diaphragms to cause the fluids passing through to take a circuitous route in passing a short distance in length, and thereby be more thoroughly commingled, and the arrangement and construction of which is quite well known—I connect a small pipe, 4, with the gas-pipe 1, which pipe 4 extends down to a point beneath a small chamber, 6, and is then supplied with a burner-tip at its extremity. Within this chamber 6 is a vessel, 5, to which is connected a pipe, 15, communicating above with the valve-case 9, provided with a partition, 13, through which is a valve-orifice, 11. Within the pipe 15 is a float, 8, to which is attached a rod, 10, extending up through the valve-orifice 11, with a disk, 12, secured to said rod above the orifice.

The burner-pipe 4 is supplied with a cock or valve, by which the flow of vapor-gas from the pipe 1 through the pipe 4 to its burner is controlled, and it will be perceived that this pipe 4 takes the vapor-gas from the pipe 1 after it has been diluted with common air. A sufficient quantity of some fluid which is sufficiently sensitive to heat as to its expansive quality—such as quicksilver—is placed in the vessel 5 to just support the float 8 on its surface, the vessel 5 and apparatus connected therewith being shown in Fig. I. If now the current of common air is forced by the pump A through the pipe B to and through the generator, it is there fully charged with the vapor of the hydrocarbon oil, and when the burners are opened it will pass through the pipe 1 to the burners, the valve 12 being closed, and the valve 14 being properly adjusted to permit the desired amount of gas to flow from the pipe 1, through the pipe 4, to the burner beneath the vessel 5, the jet at that burner is lighted. With the valve 12 closed the vapor-gas passing through the pipe 1 and pipe 4 will be too rich in carbon to serve the best purposes of illumination, and the jet beneath the vessel 5 will give off a superfluous degree of heat, which will cause the quicksilver or other fluid in the vessel 5 and pipe 15 to expand and raise the float 8 a little, (more or less,) according as the adjustment is made of the valve 14, this movement of the float and the rod 10 connected therewith raising the valve 12 and opening the valve-orifice 11. This opening of the valve-orifice permits the air from the pump and pipe C to pass through into the pipe 1, and to be mixed thoroughly with the hydrocarbon vapor passing through within the mixer 3, which has the effect of diluting the hydrocarbon vapor and rendering it less rich in carbon, so that the diluted or reduced vapor passes into the pipe 4 to the burner beneath the vessel 5. Of course the effect of this is to reduce the heating quality of the jet beneath the vessel 5, and consequently to cause a corresponding reduction in the expansion of the fluid in the vessel 5, and a corresponding partial closing of the valve-orifice 11 by the slight falling of the valve 12. If the latter falls too much, and causes too little a reduction or dilution of the hydrocarbon vapor by the admission of too little atmospheric air, the vapor-gas, becoming too rich in carbon again, will by an increase of heat in the jet beneath the vessel again raise the valve 12.

When the valve 14 is properly adjusted to give a jet beneath the vessel 5 of just the proper size and degree of heat the apparatus will be perfectly automatic in its action, and the proper and desired amount of atmospheric air will be admitted through the valve-orifice to dilute the hydrocarbon vapor to give the required illuminating-power to all the burners in use, according as the jet beneath the vessel is adjusted. This adjustment may be made to any degree of course, and when once made the size and quality of the flame at all the burners will always remain uniform, whether the generator has just been replenished with hydrocarbon oil, or is nearly empty, and little except residuum remains; because, if the vapor is exceedingly poor in carbon, the jet, being deficient in heat, will allow the fluid in the vessel 5 to contract, and the valve to close its orifice and shut off the atmospheric air, and if the vapor is too rich, as it will be when the generator is just filled, the heat of the governing-jet beneath the vessel 5 will be excessive, the valve will be raised, and more atmospheric air admitted to the vapor-gas, and the jets at the burners will be maintained at a uniform quality.

It will be seen from the above description that as the pipe 4 communicates with the pipe 1 at a point after the atmospheric air is mixed with the hydrocarbon vapor, the jet beneath the vessel 5, issuing from the pipe 4, furnishes the sample or standard to which the mixture shall be made, and by its own quality in burning keeps that standard uniform.

The chamber 6 around the vessel 5 may be provided with holes for ventilation, if desired; but its object is to somewhat confine the heated air around the vessel 5, and also to prevent cold currents of air from striking the vessel 5, which might tend to cool the vessel sufficiently to affect the medium within and cause it to change.

In Fig. II is illustrated a method of operating the valve 12 through the medium of air as an expanding fluid, instead of a liquid such as quicksilver. When using air as an expanding fluid or medium for operating the valve I use a diaphragm, as shown substantially in Fig. II, in which $a$ is a spherical or spheroidal case, approximately and preferably made in two halves or parts, each provided with a flange, as at $c$, which being placed together, with the outer edge of a flexible diaphragm between them, are bolted together, as shown clearly in Fig. II. The lower end of the valve-rod 10 is secured to this diaphragm, which in the drawings is shown as raised by the heated air in the vessel 5 and pipe 15, and thereby raising the valve 12 and opening the orifice 11; but if this diaphragm, although thin and flexible, be of some metal, and the heat of the governing-jet be properly applied thereto, the diaphragm will in that case, perhaps, be sufficiently sensitive as to rise as the metal is expanded, and the valve be raised, in which case the vessel 5 will not be required.

It will thus be seen that the valve is operated, and the valve-orifice thereby opened or closed to regulate the flow of atmospheric air through the pipe C and into the gas-pipe 1, by the variations in the heat of the flame of the governing-jet, caused by the changes in the conditions of the fluids in the gas-pipe 1 after being mixed.

It is of course evident that the particular form of valve-orifice is immaterial, so long as the movement of the valve is caused by this automatic variation in the flame of the governing-jet, so as to preserve uniformity in the quality of the light at all the burners supplied with vapor-gas from the pipe 1 under all circumstances.

It is evident, also, that it is immaterial as to what kind of pump is used to force the air into and through the generator to be charged with the hydrocarbon vapor, or as to what kind of generator is used, inasmuch as the automatic operation of the flame of the governing-jet and the valve have no functional connection with the pump or the generator, and does not depend upon the particular operation of either.

In this manner aeriform fluids of any kind may be mixed together in any desired proportions, and the mixture kept uniform as to its quality. For example, ordinary illuminating-gas may be mixed with a hydrocarbon vapor, and with common atmospheric air also, if desired.

Of course it is necessary that the flame at the governing-jet should be burned under a uniform pressure, which of course can be done by using any of the ordinary regulating-burners, or by attaching a regulator to the pipe 4.

Having thus described my invention, what I claim as new is—

1. In an apparatus for mixing aeriform fluids, a pipe through which one of the fluids passes to the mixing-pipe, provided with a valve-orifice, in combination with a valve to increase or diminish the opening of said orifice, and connected with a suitable medium susceptible of being expanded and contracted by the variable heat of a flame applied thereto, whereby the said valve is operated by the expansion and contraction of said medium, according as the heat in said flame is increased or diminished by any variation in the conditions of the fluids in the pipe after being mixed, substantially as described.

2. The combination, in an apparatus for mixing aeriform fluids, of a pipe through which one of the fluids passes to the mixing-pipe, provided with a valve-orifice, in combination with a valve to increase or diminish the opening of said orifice, and connected with a suitable medium susceptible of being expanded and contracted by the application of different degrees of heat, a vessel to contain said medium, a chamber surrounding said vessel to equalize the heat, and a burner attached to a branch from the pipe containing the mixed fluids, and adapted by its location to have the heat of its jet applied to said vessel, substantially as described.

JOHN F. BARKER.

Witnesses:
CHAS. H. WOOD,
T. A. CURTIS.